US009784081B2

United States Patent
Blom et al.

(10) Patent No.: US 9,784,081 B2
(45) Date of Patent: Oct. 10, 2017

(54) OIL RECOVERY PROCESS

(71) Applicant: SHELL OIL COMPANY, Houston, TX (US)

(72) Inventors: Carolus Petrus Adrianus Blom, Muscat (OM); Ralf Hedden, Calgary (CA); Andreas Nicholas Matzakos, Missouri City, TX (US); Ernesto Uehara-Nagamine, Houston, TX (US)

(73) Assignee: SHELL OIL COMPANY, Houston, TX (US)

(*) Notice: Subject to any disclaimer, the term of this patent is extended or adjusted under 35 U.S.C. 154(b) by 0 days.

(21) Appl. No.: 14/537,330

(22) Filed: Nov. 10, 2014

(65) Prior Publication Data

US 2015/0060075 A1    Mar. 5, 2015

Related U.S. Application Data

(63) Continuation-in-part of application No. 13/718,880, filed on Dec. 18, 2012, now abandoned.

(60) Provisional application No. 61/579,523, filed on Dec. 22, 2011.

(51) Int. Cl.
| | | |
|---|---|---|
| *E21B 43/25* | (2006.01) | |
| *E21B 43/16* | (2006.01) | |
| *C09K 8/594* | (2006.01) | |

(52) U.S. Cl.
CPC ............ *E21B 43/168* (2013.01); *C09K 8/594* (2013.01)

(58) Field of Classification Search
CPC ...... E21B 43/166; E21B 43/168; C09K 8/594
USPC .................................................. 166/401, 403
See application file for complete search history.

(56) References Cited

U.S. PATENT DOCUMENTS

| | | | |
|---|---|---|---|
| 2,859,818 A | | 8/1956 | Hall et al. |
| 3,167,118 A | * | 1/1965 | Habermann ............ C09K 8/58 |
| | | | 166/401 |
| 3,354,953 A | * | 11/1967 | Morse ........................ 166/266 |
| 3,830,301 A | | 8/1974 | Holm |
| 3,850,245 A | | 11/1974 | Allen et al. |
| 4,007,785 A | | 2/1977 | Allen et al. |
| 4,022,278 A | | 5/1977 | Allen |
| 4,299,286 A | | 11/1981 | Alston |
| 4,557,330 A | | 12/1985 | Russell et al. |
| 4,643,253 A | | 2/1987 | Shepherd et al. |
| 4,678,036 A | | 7/1987 | Hartman et al. |
| 4,722,396 A | | 2/1988 | Balzer |
| 4,794,987 A | * | 1/1989 | Kokolis et al. ............. 166/403 |
| 5,025,863 A | * | 6/1991 | Haines et al. ............ 166/305.1 |
| 5,515,919 A | * | 5/1996 | Stevens .................... C09K 8/58 |
| | | | 166/268 |

(Continued)

FOREIGN PATENT DOCUMENTS

| | | | | |
|---|---|---|---|---|
| WO | WO 2008/141051 | * | 11/2008 | ............ C09K 8/58 |
| WO | 20100002693 A2 | | 1/2010 | |

OTHER PUBLICATIONS

PCT International Search Report, Application No. PCT/US2012/070093 dated Apr. 25, 2013.

*Primary Examiner* — Doug Hutton, Jr.
*Assistant Examiner* — Avi Skaist (57) ABSTRACT

The present invention provides a method for enhancing the recovery of oil from a formation. An enhanced oil recovery formulation comprising a gas comprised of a hydrocarbon-containing gas and an ether having from 2 to 4 carbons is injected into an oil-bearing formation to mobilize the oil. The mobilized oil is then produced from the formation.

12 Claims, 4 Drawing Sheets

(56) References Cited

U.S. PATENT DOCUMENTS

| | | | |
|---|---|---|---|
| 5,711,373 A | | 1/1998 | Lange |
| 5,725,054 A | * | 3/1998 | Shayegi ................ E21B 43/164 166/263 |
| 6,619,396 B1 | | 9/2003 | Kimoto et al. |
| 7,422,064 B1 | * | 9/2008 | Yang .................... E21B 43/121 166/308.6 |
| 7,707,013 B2 | | 4/2010 | Valdez et al. |
| 2011/0272162 A1 | | 11/2011 | Mango |
| 2012/0037363 A1 | | 2/2012 | Curole |

\* cited by examiner

OIL RECOVERY PROCESS

RELATED CASES

The present application is a continuation in part of U.S. nonprovisional application Ser. No. 13/718,880, filed on Dec. 18, 2012, which claims priority to U.S. provisional application No. 61/579,523, filed Dec. 22, 2011, both of which are incorporated herein in their entireties.

FIELD OF THE INVENTION

The present invention is directed to a method of recovering oil from a formation, in particular, the present invention is directed to a method of enhanced oil recovery from a formation.

BACKGROUND OF THE INVENTION

In the recovery of oil from subterranean formations, it is possible to recover only a portion of the oil in the formation using primary recovery methods utilizing the natural formation pressure to produce the oil. A portion of the oil that cannot be produced from a formation using primary recovery methods may be produced by Enhanced Oil Recovery (EOR) methods. There are three main types of EOR—thermal, chemical/polymer and gas injection—which may be used to increase oil recovery from a reservoir beyond what can be achieved by conventional means—possibly extending the life of a field and boosting the oil recovery factor.

Thermal enhanced recovery works by adding heat to the reservoir. The most widely practiced form is a steam drive, which reduces oil viscosity so that it can flow to the producing wells. Chemical flooding increases recovery by reducing the capillary forces that trap residual oil. Polymer flooding improves the sweep efficiency of injected water. Miscible gas injection works in a similar way to chemical flooding—by injecting a fluid that is miscible with the oil, trapped remaining oil can be recovered.

In miscible gas injection, a gas that is miscible with oil in place in the formation is injected into the formation. The injected gas dissolves in the oil forming a single phase solution with the oil, mobilizing the oil by swelling the oil, thereby reducing the viscosity of the oil, and by reducing the interfacial tension between the oil and water in the formation, thereby reducing the capillary forces that hold the oil in place in the formation. The mobilized oil may be displaced to a production well and recovered from the formation. Gases that have been utilized in miscible gas injection for enhanced oil recovery include ethane, propane, butane, liquid petroleum gases formed of $C_2$ to $C_6$ paraffinic hydrocarbons, synthesis gas (carbon monoxide and hydrogen), nitrogen, natural gas, and carbon dioxide.

In order for gas injection to provide effective recovery of oil from a formation by mobilizing the oil, the gas and the oil must be miscible under the formation conditions. The pressure and temperature of the formation, the nature of the oil in the formation, and the components of the gas determine the miscibility of the gas with oil in the formation. Gases that have components that are more similar to the oil in the formation are more miscible than gases that are less similar to the oil. Therefore, hydrocarbon-containing gases having higher carbon numbers (e.g. propane (C3) and butane (C4)) are more miscible in oil (typically formed of hydrocarbons having carbon numbers of C5 and greater) than methane (C1) or carbon dioxide. Higher formation pressure (e.g. >50 MPa) also facilitates miscibility of the gas with oil in the formation, where gases that have relatively low miscibility in the oil at low pressures may be miscible in the oil in the formation due to the pressure in the formation.

Associated gas is a form of natural gas frequently produced in conjunction with the production of oil from a formation. Associated gas is often considered a waste product, particularly when produced from remotely located formations having no access to a gas pipeline. Waste associated gas is commonly flared to dispose of the associated gas.

Associated gas is commonly comprised of at least 70 mol % methane, and may contain upwards of 75 mol %, or 80 mol %, or 90 mol % methane. Methane is miscible with oil at higher pressures (e.g 100 MPa at 100° C.), however, methane is immiscible with oil at lower pressures (e.g. less than 50 MPa) since the pressure is below the minimum miscibility pressure required to establish multiple contact miscibility of methane with the oil. As a result, associated gas or other gases formed primarily of methane have been unsuitable for use as a miscible gas for enhanced oil recovery from formations having a pressure of less than 50 MPa.

It is desirable to be able to utilize associated gas, or another hydrocarbon-containing gas, that contains a large mole fraction of methane as a gas in a miscible gas enhanced oil recovery process.

SUMMARY OF THE INVENTION

The present invention is directed to a method for recovering oil from an oil-bearing formation, comprising:

injecting an enhanced oil recovery formulation comprising a gas comprised of an ether containing from 2 to 4 carbon atoms and a hydrocarbon-containing gas into the formation, where the hydrocarbon-containing gas is comprised of at least 70 mol % methane, and wherein the gas comprised at least 70 mol % of the enhanced oil recovery formulation;

contacting the enhanced oil recovery formulation with oil in the formation to mix the gas of the enhanced oil recovery formulation with the oil; and producing oil from the formation.

DETAILED DESCRIPTION OF THE INVENTION

The present invention is directed to a method for utilizing an enhanced oil recovery formulation comprising a gas comprising a hydrocarbon-containing gas comprised of at least 70 mol % methane and an ether having from 2 to 4 carbon atoms to recover oil from an oil-bearing formation. The formation may have a pressure below the minimum miscibility pressure of the hydrocarbon-containing gas or the ether of the gas with the oil in the formation. The gas of the enhanced oil recovery formulation may have a minimum miscibility pressure with the oil in the formation that is below the pressure of the formation or the gas may be injected into the formation at a pressure above the minimum miscibility pressure of the gas with the oil in the formation, so the enhanced oil recovery formulation gas comprising the hydrocarbon-containing gas or the ether of the gas is multiple contact miscible with the oil in the formation, wherein the gas comprised of the hydrocarbon-containing gas and the ether may have a minimum miscibility pressure that is lower than the minimum miscibility pressure of either the hydrocarbon-containing gas or the ether alone. The enhanced oil recovery formulation, therefore, mobilizes the oil for recovery from the formation.

The oil in a formation may be recovered following primary recovery by injecting an enhanced oil recovery formulation comprising a gas comprised of a hydrocarbon-containing gas comprising at least 70 mol % methane and an ether comprising from 2 to 4 carbon atoms into the formation through first well that extends into the formation. In a preferred embodiment of the method of the present invention, the gas of the enhanced oil recovery formation contains a hydrocarbon-containing gas that is associated gas produced from the formation and an ether that is dimethyl ether. The pressure of the formation at the location in the formation where the enhanced oil recovery formulation is injected may be below the minimum miscibility pressure required for multiple contact miscibility with the either the hydrocarbon-containing gas or the ether of the gas alone, but may be above the pressure required for multiple contact miscibility with the enhanced oil recovery formulation gas comprising both the hydrocarbon-containing gas and the ether. The enhanced oil recovery formulation is contacted with the oil in the formation to mix the enhanced oil recovery formulation gas comprising the hydrocarbon-containing gas and the ether with the oil and thereby mobilize the oil. The mobilized mixture of oil and enhanced oil recovery formulation may be driven across the formation by further injection of the enhanced oil recovery formulation, and oil may be produced from the formation via a second well extending into the formation or adjacent to the formation, where the second well is located a distance from the first well. An oil-immiscible displacement fluid may be injected into the formation through the first well subsequent to injecting the enhanced oil recovery formulation into the formation to drive the mobilized oil to the second well for production of the oil from the second well.

Figure 1:
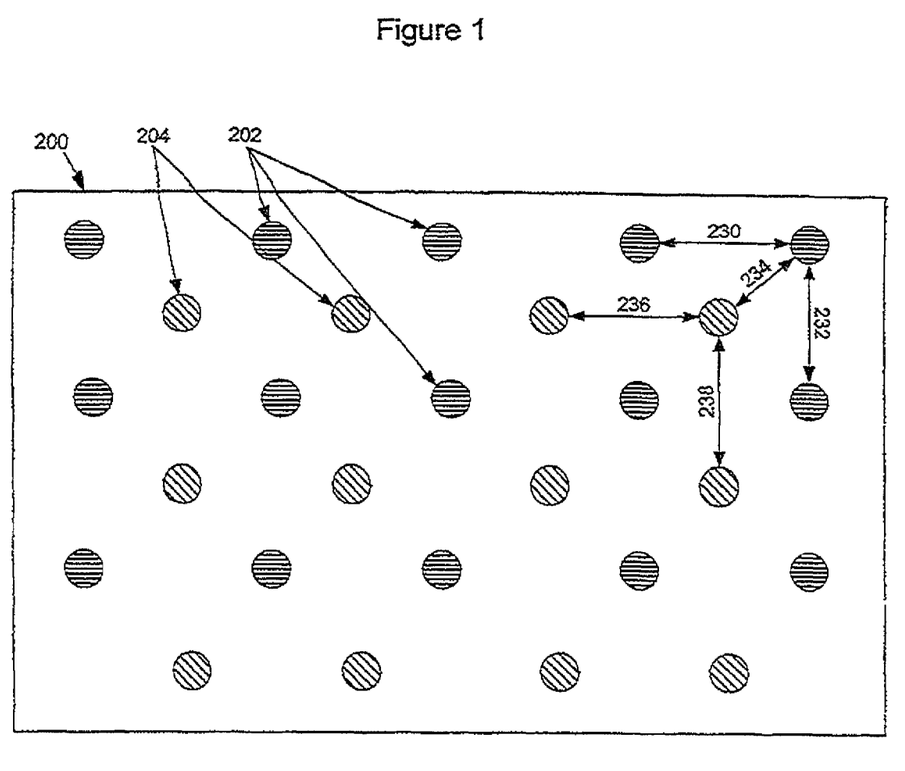
FIG. 1 illustrates a well pattern.

Referring now to FIG. 1, an array of wells 200 is illustrated. Array 200 includes a first well through which the enhanced oil recovery formulation is injected into the formation and a second well through from which is oil produced. The first well may be included in first well group 202 (denoted by horizontal lines) and the second well may be included in second well group 204 (denoted by diagonal lines).

Each well in first well group 202 may be spaced a horizontal distance and a vertical distance from adjacent wells in the first well group, where each horizontal distance between adjacent wells of the first well group 202 may be roughly equal and the vertical distance between adjacent wells of the first well group 202 may be roughly equal. Each well in first well group 202 may have a horizontal distance 230 from an adjacent well in first well group 202. Each well in first well group 202 may have a vertical distance 232 from an adjacent well in first well group 202.

Each well in the second well group 204 may be spaced a horizontal distance and a vertical distance from adjacent wells in the second well group, where each horizontal distance between adjacent wells of the second well group may be roughly equal and each vertical distance between adjacent wells of the second well group may be roughly equal. Each well in second well group 204 may have a horizontal distance 236 from an adjacent well in second well group 204. Each well in second well group 204 may have a vertical distance 238 from an adjacent well in second well group 204.

The wells of the first well group 202 have a distance from adjacent wells of the second well group 204. Each well in first well group 202 may have a distance 234 from the adjacent wells in second well group 204. Each well in second well group 204 may have a distance 234 from the adjacent wells in first well group 202.

In some embodiments, each well in first well group 202 is surrounded by four wells in second well group 204. In some embodiments, each well in second well group 204 is surrounded by four wells in first well group 202.

In some embodiments, horizontal distance 230 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, vertical distance 232 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, horizontal distance 236 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, vertical distance 238 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, distance 234 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, array of wells 200 may have from about 10 to about 1000 wells, for example from about 5 to about 500 wells in first well group 202, and from about 5 to about 500 wells in second well group 204.

In some embodiments, array of wells 200 is seen as a top view with first well group 202 and second well group 204 being vertical wells spaced on a piece of land. In some embodiments, array of wells 200 is seen as a cross-sectional side view with first well group 202 and second well group 204 being horizontal wells spaced within the formation.

The formation into which the enhanced oil recovery formulation is injected is an oil-bearing formation. The formation may have a pressure below the minimum miscibility pressure required for multiple contact miscibility of the either the hydrocarbon-containing gas or the ether of the enhanced oil recovery formulation gas alone with the oil in the formation. The formation may have a formation pressure at the location the enhanced oil recovery formulation is contacted with oil that is above the minimum miscibility pressure required for multiple contact miscibility of the gas of the enhanced oil recovery formulation comprising both the hydrocarbon-containing gas and the ether with the oil. The formation may have a pressure of less than 50 MPa, or at most 45 MPa, or at most 40 MPa, or from 5 MPa up to 50 MPa, or from 10 MPa to 40 MPa. The formation may be a relatively shallow formation, where the formation is located at a depth of from 100 to 1500 meters, or from 200 to 1000 meters, or from 300 to 800 meters.

The formation preferably is conducive to a miscible gas flood for enhanced oil recovery. The formation may have enough permeability so the mobilized oil may be driven from the first well injection site to the second well for production from the second well. The formation may have a permeability of from 0.0001 to 1 Darcy. The formation also preferably has relatively few fractures in the flow path between the first well injection site and the second well production site so the flow of the mobilized oil between the injection site and the production site is relatively unimpeded and is not subject to channeling. If the formation has a relatively large number of fractures, the first well injection site and the second well production site may be located more closely together to reduce the effect of the fractures on the flow of the mobilized oil to the production well than if the formation has relatively few fractures.

The oil in the formation may have a relatively low viscosity so the oil is relatively easily miscible with the gas of the enhanced oil recovery formulation. The oil in the formation may have a viscosity of at most 15 cP, or at most 10 cP, or at most 5 cP, or from 0.1 to 15 cP, or from 0.5 cP to 10 cP, or from 1 cP to 5 cP.

The formation may contain connate water in contact with the oil in the formation, where the interfacial tension between the connate water and the oil in the formation may be partially responsible for retention of the oil in the formation. Contact of the gas of the enhanced oil recovery formulation with the oil may reduce the interfacial tension between the oil and the connate water by changing the physical characteristics of the oil upon miscibilization of the oil with the enhanced oil recovery formulation, enabling the mobilization of the oil for production from the formation. The interfacial tension of the oil and the connate water may range from 15 to 25 dynes/cm at 15° C. and a pressure of 34.4 kPa (5 psi) which may be reduced by at least 10% or at least 15%, or at least 20% upon miscibilization of the oil with the enhanced oil recovery formulation.

The enhanced oil recovery formulation is comprised of a gas comprising a hydrocarbon-containing gas and an ether containing from 2 to 4 carbon atoms. The enhanced oil recovery formulation may also contain a liquid solvent that is miscible with oil in the formation. The liquid solvent may be a hydrocarbon, a halogenated hydrocarbon, carbon disulfide, or dimethyl sulfide. The enhanced oil recovery formulation is comprised of at least 70 mol %, or at least 80 mol %, or at least 90 mol % of the gas, and at most 30 mol %, or at most 20 mol %, or at most 10 mol % of the liquid solvent. In a preferred embodiment, a liquid solvent is absent from the enhanced oil recovery formulation, and the enhanced oil recovery formulation consists of the gas comprising the hydrocarbon-containing gas and the ether.

The hydrocarbon-containing gas of the gas of the enhanced oil recovery formulation contains at least 70 mol % methane. The hydrocarbon-containing gas may contain at least 80 mol % methane, or at least 85 mol % methane, or at least 90 mol % methane, or at least 95 mol % methane, or may contain from 70 to 99 mol % methane, or from 75 to 95 mol % methane. The hydrocarbon-containing gas may also contain from 0.1 mol % to 15 mol %, or from 0.5 mol % to 10 mol %, or from 1 mol % to 5 mol % of $C_2$ to $C_6$ hydrocarbons including ethane, propane, butanes, pentanes, and hexanes. The hydrocarbon-containing gas may also contain carbon dioxide and hydrogen sulfide, for example from 0.1 mol % to 10 mol % carbon dioxide, and from 0.1 mol % to 5 mol % hydrogen sulfide. The hydrocarbon-containing gas may be natural gas.

In a preferred embodiment of the invention, the hydrocarbon-containing gas of the gas of the enhanced oil recovery formulation is an associated gas produced from the formation. The associated gas may be produced from the formation in conjunction with the production of oil from the formation. Preferably the associated gas is stranded gas.

The ether of the gas of the enhanced oil recovery formulation may have from 2 to 4 carbon atoms. The ether may be dimethyl ether, diethyl ether, or methyl ethyl ether. Preferably the ether is dimethyl ether. The ether to be injected into the formation may be produced according to conventional methods of producing the type of ether selected for injection into the formation.

The hydrocarbon-containing gas and the ether of the gas, and liquid solvent if any, of the enhanced oil recovery formulation are mixed prior to or upon injecting the enhanced oil recovery formulation into the formation. The hydrocarbon-containing gas and the ether, and liquid solvent if any, may be mixed before injection of the enhanced oil recovery formulation into the formation and then injected as a mixture into the formation. Alternatively, the hydrocarbon-containing gas and the ether, and liquid solvent if any, may be mixed in the injecting well prior to contact of the enhanced oil recovery formulation with the oil in the formation, for example using an in-line mixer. Alternatively, the hydrocarbon-containing gas and the ether, and liquid solvent if any, may be injected separately into the formation so the hydrocarbon-containing gas and the ether, and liquid solvent if any, mix upon entering the formation to form the enhanced oil recovery formulation which then contacts the oil.

The gas of the enhanced oil recovery formulation is selected to contain a sufficient amount of the ether so that the gaseous mixture of the hydrocarbon-containing gas and ether is miscible with the oil in the formation upon multiple contact at the pressure at which the enhanced oil recovery formulation is contacted with the oil. In particular, the gas of the enhanced oil recovery formulation contains a sufficient amount of the ether so that the mixture has a minimum miscibility pressure with the oil in the formation that is no higher than, and preferably is below, the formation pressure at which the enhanced oil recovery formulation is contacted with the oil. It may be desirable to include an additional amount of ether in the gas of the enhanced oil recovery formulation over the amount of ether required to provide the gas with a minimum miscibility pressure with the oil in the formation that is no higher than the formation pressure at which the mixture is contacted with the oil, where the additional amount of ether may further reduce the minimum miscibility pressure of the gas of the enhanced oil recovery formulation with the oil, further enhancing the miscibility of the gas of the enhanced oil recovery formulation with the oil.

The amount of ether sufficient to render the gas of the enhanced oil recovery formulation miscible with the oil in the formation upon multiple contact at the pressure at which the gas is contacted with the oil (i.e. the amount of ether required for the gas of the enhanced oil recovery formulation to have a minimum miscibility pressure with the oil no higher than the pressure at which the gas is contacted with the oil in the formation) is dependent on the formation conditions, particularly the formation pressure, the composition of the oil, the viscosity and density of the oil, the composition of the hydrocarbon-containing gas utilized in the gas of the enhanced oil recovery formulation, the ether utilized in the gas of the enhanced oil recovery formulation, and the pressure at which the enhanced oil recovery formulation is injected into the formation. The amount of ether required for use in the gas of the enhanced oil recovery formulation to provide miscibility of the gas with the oil in the formation, therefore, may vary depending on several factors. The amount of ether required for use in the gas of the enhanced oil recovery formulation to provide the requisite miscibility of the gas with the oil in the formation at the formation pressure at which the enhanced oil recovery formulation is contacted with the oil, however, may be determined by simple miscibility experiments at the pressure of the formation using samples of the oil from the formation and the gas of the enhanced oil recovery formulation. Typically, the amount of ether required for use in the gas of the enhanced oil recovery formulation to provide the requisite miscibility of the enhanced oil recovery formulation gas with the oil in the formation at the formation pressure at which the enhanced oil recovery formulation is contacted with the oil is at least 5 mol % of the ether in the gas of the enhanced oil recovery formulation, or at least 10 mol %, or from 5 mol % to 25 mol %, or from 10 mol % to 20 mol % of the gas of the enhanced oil recovery formulation. In an embodiment of the method of the present invention, the amount of ether provided in the gas of the enhanced oil recovery formulation that is injected into the formation for contact with the oil is from 5 mol % to 45 mol %, or from 10 mol % to 40 mol % of the gas of the enhanced oil recovery formulation.

Figure 2:
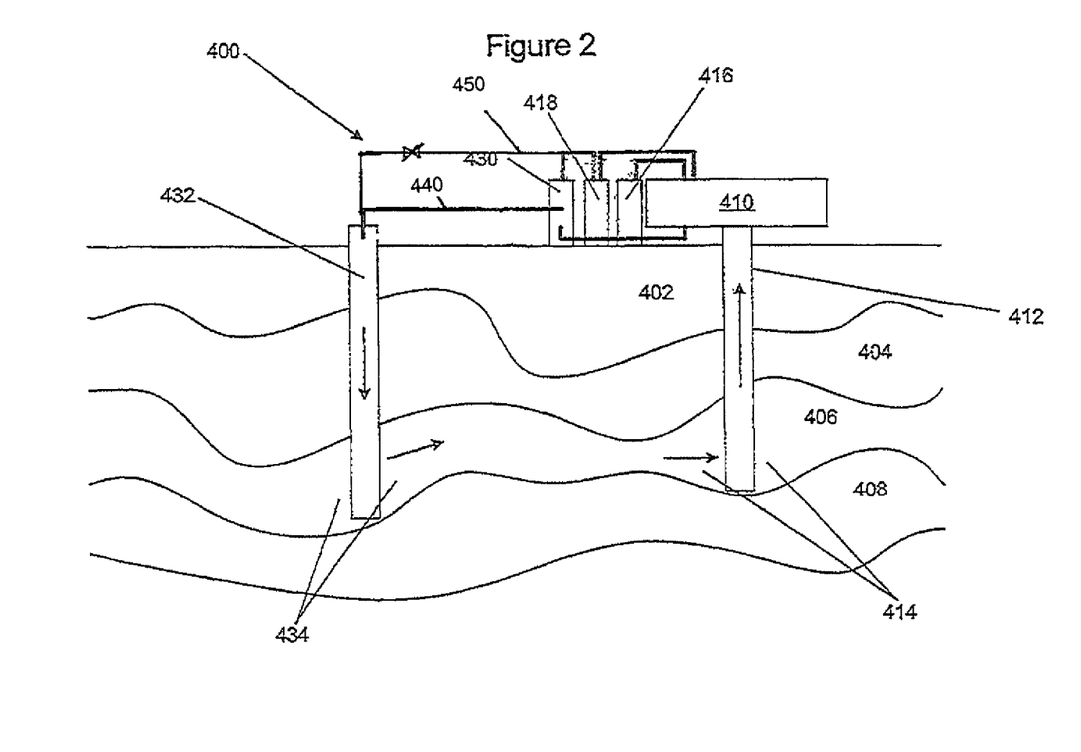
FIG. 2 illustrates a schematic of an oil production system.

Referring now to FIG. 2, the enhanced oil recovery formulation may be injected into a subterranean formation comprising formation portions 402, 404, 406, and 408, where the enhanced oil recovery formulation is injected into formation 406 through an injection well 432 which traverses formation portions 402 and 406 and has openings at formation portion 406. The ether of the gas of the enhanced oil recovery formulation may be stored in ether storage 430 and the hydrocarbon-containing gas of the gas of the enhanced oil recovery formulation may be stored in hydrocarbon-containing gas storage 418. As discussed above, the hydrocarbon-containing gas may be mixed with the selected amount of ether prior to providing the enhanced oil recovery formulation to the injection well 432, where the enhanced oil recovery formulation may be provided to the injection well 432 through line 440 for injection into the formation 406. Alternatively, the hydrocarbon-containing gas of the gas of the enhanced oil recovery formulation may be provided to the injection well 432 through line 450 and the selected amount of ether of the gas of the enhanced oil recovery formulation may be provided to the injection well 432 through line 440, and the hydrocarbon-containing gas and the ether may be mixed in the injection well 432 to form the gas of the enhanced oil recovery formulation prior to injection into the formation 406, or the hydrocarbon-containing gas and the ether may be injected separately but in close proximity into the formation 406 so the hydrocarbon-containing gas and the ether mix to form the gas of the enhanced oil recovery formulation upon entering the formation 406.

The enhanced oil recovery formulation is preferably injected into portions 434 of the formation 406 at a pressure at least slightly above the formation pressure at the formation portions 434 to ensure that the enhanced oil recovery formulation enters the formation 406 and drives oil mobilized by the injected enhanced oil recovery formulation towards oil production well 412. The formation pressure may be determined by conventional methods for determining the pressure of a formation. If the formation pressure at formation portions 434 is below the minimum miscibility pressure of the gas of the enhanced oil recovery formulation with oil in the formation, the enhanced oil recovery formulation may be injected into the formation 406 at a pressure greater than the formation pressure, and preferably greater than the minimum miscibility pressure of the gas of the enhanced oil recovery formulation with the oil in the formation.

The amount of the enhanced oil recovery formulation injected into the formation 406 may preferably range from 0.2 to 0.6 of the formation pore volume between an injecting well and a producing per injection, or from 0.25 to 0.5 of the formation pore volume between an injecting well and a producing well per injection. The formation pore volume between an injecting well and a producing well may be determined by methods conventional in the art. As discussed in further detail below, multiple injections of slugs of the enhanced oil recovery formulation may be injected into the formation 406 to enhance recovery of oil from the formation.

The enhanced oil recovery formulation is contacted with oil in the formation 406 by injection of the mixture into the formation at a formation portion 434 where the oil is present in the formation. Upon contact with the oil, the gas of the enhanced oil recovery formulation becomes miscible with the oil because the minimum miscibility pressure of the gas with the oil is at or below the pressure of the formation at the formation portion 434. As the enhanced oil recovery formulation is injected into the formation 406 and contacted with the oil, the enhanced oil recovery formulation may extract light hydrocarbons (e.g. $C_2$ to $C_6$ hydrocarbons) thereby developing a hydrocarbon-containing solution at the interface between the enhanced oil recovery formulation and the oil. As the injection front proceeds through the formation from formation portion 434 towards formation portion 414 and the production well 412 the hydrocarbon-containing solution may be able to dissolve heavier hydrocarbons which enter the solution, and may eventually produce a single phase mobilized oil front that is driven through the formation to formation portion 414 and produced through the production well 412.

As the gas of the enhanced oil recovery formulation becomes miscible with the oil, the oil density and viscosity may be reduced as the light hydrocarbons from the gas become miscible in the oil, resulting in swelling of the oil. The swelling factor of the oil after being contacted with the gas of the enhanced oil recovery formulation may increase by at least 25% or by at least 50% relative to the oil prior to contact with the gas. The interfacial tension between the oil and connate water may also be reduced as the gas of the enhanced oil recovery formulation becomes miscible with the oil due to the changing density, viscosity, and composition of the oil. The interfacial tension between the oil and the connate water in the formation may be reduced by at least 15%, or at least 20%, or at least 25% by contact of the gas of the enhanced oil recovery formulation with the oil. As a result of the miscible displacement of the oil upon contact of the enhanced oil recovery formulation and the oil swelling and interfacial tension reduction, the oil mobilizes and will be moved through the formation 406 for production through the production well 412.

In one embodiment of the method of the present invention, the amount of ether in the gas of the enhanced oil recovery formulation may be reduced after the initial injection of the enhanced oil recovery formulation into the formation. As the oil and the initial gas of the enhanced oil recovery formulation become miscible and a single phase mobilized oil is produced, the minimum miscibility pressure for multiple contact miscibility of the gas with the mobilized oil becomes reduced relative to the minimum miscibility pressure for multiple contact miscibility of the gas with the immobilized oil initially in place in the formation. As a result, less ether may be required in the gas of the enhanced oil recovery formulation to maintain miscibility of the gas of the enhanced oil recovery formulation with the oil at the formation pressure. The amount of ether in the gas of the enhanced oil recovery formulation may be reduced by continuously reducing the amount of ether in the enhanced oil recovery formulation injected into the formation, or may be reduced by step-wise reduction of the amount of ether in the enhanced oil recovery formulation injected into the formation.

Injection of the enhanced oil recovery formulation into the formation 406 may increase sweep efficiency for recovering and producing oil from the formation relative to injection of a hydrocarbon-containing gas alone. The gas of the enhanced oil recovery formulation may be more miscible with the oil in the formation than a hydrocarbon-containing gas alone. As a result, swelling of the oil by multiple contact miscibility is greater with the gas of the enhanced oil recovery formulation than with the hydrocarbon-containing gas alone, increasing the size of the miscible zone and the amount of oil contacted by the enhanced oil recovery formulation relative to a hydrocarbon-containing gas alone, thereby improving the sweep efficiency through the formation of the gas of the enhanced oil recovery formulation relative to a hydrocarbon-containing gas alone.

In an embodiment of the method of the present invention, an oil-immiscible displacement fluid may be injected into the formation 406 after injection of the enhanced oil recovery formulation into the formation. The oil-immiscible displacement fluid may serve to drive the oil mobilized by contact with the enhanced oil recovery formulation through the formation from formation portion 434 to formation portion 414 for production through the production well 412. The amount of oil-immiscible displacement fluid injected into the formation may be from 0.2 to 5 pore volumes, or from 0.3 to 2 pore volumes, or from 0.5 to 1.0 pore volumes of the portion of the formation to be swept by the oil-immiscible displacement fluid, where the pore volume of the formation to be swept by the immiscible displacement fluid may be the pore volume of the formation between an injecting well and a producing well.

Slugs of the enhanced oil recovery formulation and the oil-immiscible displacement fluid may be injected in an alternating pattern to enhance recovery of oil from the formation. The amount of each slug of the enhanced oil recovery formulation injected in such an alternating pattern may range from 0.2 to 0.6 of the formation pore volume to be swept by the enhanced oil recovery formulation, followed by an injection of an amount of the oil-immiscible displacement fluid from 0.2 to 1 times the pore volume of the formation to be swept by the oil-immiscible displacement fluid, where the pore volume of the formation to be swept by the enhanced oil recovery formulation and the oil-immiscible displacement fluid may be the pore volume of the formation between an injecting well and a producing well. Alternating slugs of the enhanced oil recovery formulation and the oil-immiscible displacement fluid may be injected until oil production is exhausted, typically from 3-6 times.

The oil-immiscible displacement fluid may be a liquid or a gas. Preferably the oil-immiscible fluid is selected from the group consisting of water in liquid or vapor form, an aqueous brine solution, an aqueous solution containing surfactants and/or polymers, or, less preferably, air or nitrogen.

Oil is produced from the formation 406 through the production well 412. The oil that is produced may include a portion of the miscibilized gas of the enhanced oil recovery formulation injected into the formation to mobilize the oil. Associated gas may also be produced from the formation 406 along with the oil.

The produced oil, associated gas, and miscibilized gas of the enhanced oil recovery formulation may be provided from the production well 412 to a production facility 410. The associated gas and miscibilized gas of the enhanced oil recovery formulation may be separated from the oil in the production facility, for example in a gas-liquid separator, and stored in the gas storage 418 from which the associated gas and produced gas from the enhanced oil recovery formulation may be re-injected into the formation for further oil recovery. Ether contained in the separated produced gas may also be separated from the associated gas and other hydrocarbon-containing gases in the production facility 410, for example by water extraction of the ether from the separated produced gas. The separated ether may be provided from the production facility 410 for storage in the ether storage 430 from which the ether may be re-injected into the formation for further recovery of oil. The oil separated from the associated gas and the produced separated miscibilized gas of the enhanced oil recovery formulation may be stored in oil storage 416. The oil may be further processed to produce transportation fuels, lubricants, heating fuel, chemicals, and/or polymers.

To facilitate a better understanding of the present invention, the following examples of certain aspects of some embodiments are given. In no way should the following examples be read to limit, or define, the scope of the invention. The scope of the invention is to be defined by the claims appended hereto.

Example 1

Slim tube experiments were conducted to determine the effect of dimethyl ether (DME) on the miscibility of associated gas with oil recovered from a formation. Dead oil recovered from a formation was filtered and mixed with associated gas produced from the same formation to reach the desired gas-to-oil ratio (91.84 cc/cc) and bubble point pressure (38.3 MPa) to produce a recombined live oil having the properties of the oil in the formation. The composition of the live oil is provided in Table 1 and the composition of the associated gas is provided in Table 2.

TABLE 1

| Component Name | Chemical Symbol | Mole Fraction | Mass Fraction | Calculated Properties | |
|---|---|---|---|---|---|
| Nitrogen | $N_2$ | 0.0008 | 0.0002 | Total Sample | |
| Carbon Dioxide | $CO_2$ | 0.0009 | 0.0003 | Molucular Weight | 133.96 |
| DME | DME | 0.0000 | 0.0000 | Density (g/cc) | 0.7815 |

TABLE 1-continued

| Component Name | Chemical Symbol | Mole Fraction | Mass Fraction | Calculated Properties | |
|---|---|---|---|---|---|
| Methane | $C_1$ | 0.4474 | 0.0536 | $C_{6+}$ Fraction | |
| Ethane | $C_2$ | 0.0240 | 0.0054 | Molecular Weight | 260.80 |
| Propane | $C_3$ | 0.0228 | 0.0075 | Mole Fraction | 0.4710 |
| i-Butane | $i\text{-}C_4$ | 0.0042 | 0.0018 | Density (g/cc) | 0.8788 |
| n-Butane | $n\text{-}C_4$ | 0.0118 | 0.0051 | $C_{7+}$ Fraction | |
| i-Pentane | $i\text{-}C_5$ | 0.0073 | 0.0039 | Molecular Weight | 270.50 |
| n-Pentane | $n\text{-}C_5$ | 0.0098 | 0.0053 | Mole Fraction | 0.4462 |
| Hexanes | $C_6$ | 0.0248 | 0.0160 | Density (g/cc) | 0.8833 |
| Heptanes | $C_7$ | 0.0395 | 0.0294 | $C_{12+}$ Fraction | |
| Octanes | $C_8$ | 0.0450 | 0.0377 | Molecular Weight | 373.03 |
| Nonanes | $C_9$ | 0.0376 | 0.0360 | Mole Fraction | 0.2627 |
| Decanes | $C_{10}$ | 0.0337 | 0.0358 | Density (g/cc) | 0.9173 |
| Undecanes | $C_{11}$ | 0.0277 | 0.0304 | $C_{36+}$ Fraction | |
| Dodecanes | $C_{12}$ | 0.0224 | 0.0270 | Molecular Weight | 763.16 |
| Tridecanes | $C_{13}$ | 0.0218 | 0.0285 | Mole Fraction | 0.0641 |
| Tetradecanes | $C_{14}$ | 0.0194 | 0.0275 | Density (g/cc) | 0.9930 |
| Pentadecanes | $C_{15}$ | 0.0170 | 0.0261 | $C_{36+}$ Fraction | |
| Hexadecanes | $C_{16}$ | 0.0141 | 0.0234 | Molecular Weight | 919.21 |
| Heptadecanes | $C_{17}$ | 0.0132 | 0.0233 | Mole Fraction | 0.0429 |
| Octadecanes | $C_{18}$ | 0.0120 | 0.0226 | Density (g/cc) | 1.0154 |
| Nonadecanes | $C_{19}$ | 0.0112 | 0.0219 | Recombination Parameters | |
| Eicosanes | $C_{20}$ | 0.0098 | 0.0202 | Gas-Oil Ratio (cc/cc) | 91.84 |
| Heneicosanes | $C_{21}$ | 0.0091 | 0.0197 | Dead Oil Density (g/cc) | 0.8894 |
| Docosanes | $C_{22}$ | 0.0077 | 0.0174 | Dead Oil MW (g/mol) | 261.25 |
| Tricosanes | $C_{23}$ | 0.0073 | 0.0173 | | |
| Tetracosanes | $C_{24}$ | 0.0066 | 0.0164 | | |
| Pentacosanes | $C_{25}$ | 0.0060 | 0.0156 | | |
| Hexacosanes | $C_{26}$ | 0.0056 | 0.0150 | | |
| Heptacosanes | $C_{27}$ | 0.0057 | 0.0159 | | |
| Octacosanes | $C_{28}$ | 0.0050 | 0.0146 | | |
| Nonacosanes | $C_{29}$ | 0.0047 | 0.0141 | | |
| Tricontanes | $C_{30}$ | 0.0044 | 0.0138 | | |
| Hentriacontanes | $C_{31}$ | 0.0040 | 0.0127 | | |
| Dotriacontanes | $C_{32}$ | 0.0037 | 0.0122 | | |
| Tritriacontanes | $C_{33}$ | 0.0033 | 0.0113 | | |
| Tetratriacontanes | $C_{34}$ | 0.0031 | 0.0110 | | |
| Pentatriacontanes | $C_{35}$ | 0.0027 | 0.0098 | | |
| Hexatriacontanes plus | $C_{36+}$ | 0.0429 | 0.2946 | | |
| | | 1.0000 | 1.0000 | | |

Physical Properties calculated based on GPA 2145-00 physical constants

TABLE 2

| Component Name | Chemical Symbol | Mole Fraction As Analyzed | Acid Gas Free | Liquid Volume STB/MMscf | mL/m3 |
|---|---|---|---|---|---|
| Nitrogen | $N_2$ | 0.0015 | 0.0015 | | |
| Carbon Dioxide | $CO_2$ | 0.0017 | 0.0000 | | |
| DME | DME | 0.0000 | 0.0000 | | |
| Methane | $C_1$ | 0.8403 | 0.8417 | | |
| Ethane | $C_2$ | 0.0449 | 0.0449 | | |
| Propane | $C_3$ | 0.0413 | 0.0414 | 26.990 | 151.535 |
| i-Butane | $i\text{-}C_4$ | 0.0069 | 0.0069 | 5.378 | 30.195 |
| n-Butane | $n\text{-}C_4$ | 0.0177 | 0.0177 | 13.220 | 74.224 |
| i-Pentane | $i\text{-}C_5$ | 0.0077 | 0.0077 | 6.702 | 37.630 |
| n-Pentane | $n\text{-}C_5$ | 0.0088 | 0.0088 | 7.529 | 42.274 |
| Hexanes | $C_6$ | 0.0124 | 0.0124 | 12.074 | 67.791 |
| Heptanes | $C_7$ | 0.0124 | 0.0125 | 13.621 | 76.473 |
| Octanes | $C_8$ | 0.0038 | 0.0038 | 4.557 | 25.586 |
| Nonanes | $C_9$ | 0.0007 | 0.0007 | 0.882 | 4.952 |
| Decanes | $C_{10}$ | 0.0000 | 0.0000 | 0.000 | 0.000 |
| Undecane | $C_{11}$ | 0.0000 | 0.0000 | 0.000 | 0.000 |
| Dodecanes Plus | $C_{12+}$ | 0.0000 | 0.0000 | 0.000 | 0.000 |
| Total | | 1.0000 | 1.0000 | 90.954 | 510.660 |
| Propanes Plus | $C_{3+}$ | 0.1116 | 0.1118 | 90.954 | 510.660 |
| Butanes Plus | $C_{4+}$ | 0.0703 | 0.0704 | 63.964 | 359.125 |
| Pentanes Plus | $C_{5+}$ | 0.0634 | 0.0635 | 45.366 | 254.706 |

TABLE 2-continued

| Component Name | Chemical Symbol | Mole Fraction As Analyzed | Acid Gas Free | Liquid Volume STB/MMscf | mL/m3 |
|---|---|---|---|---|---|
| Calculated Gas Properties | | | Calculated Pseudocritical Properties | | |
| Molecular Weight | 22.13 kg/kmol | 22.13 lb/lb · mol | Ppc | 654.4 psia | 4.51 MPa |
| Specific Gravity | 0.7641 (Air = 1) | 0.7641 (Air = 1) | Tpc | 402.1 R | 223.4 K |
| MW of C7+ | 99.43 kg/kmol | 99.43 lb/lbmol | Ppc$^+$ | 653.7 psia | 4.51 MPa |
| Density of C7+ | 0.7288 g/cc | 728.8 kg/m3 | Tpc$^+$ | 401.8 R | 223.2 K |
| Calculated Gross Heating Value @ Standard Conditions | | | Calculated Net Heating Value @ Standard Conditions | | |
| Dry | 1.332.2 Btu/scf | 49.73 MJ/m3 | Dry | 1.210.2 Btu/scf | 45.17 MJ/m3 |
| Wet | 1.309.1 Btu/scf | 48.86 MJ/m3 | Wet | 1.189.1 Btu/scf | 44.39 MJ/m3 |

Standard Conditions: 60 F. (288.7 K) @ 14.696 psia (0.101325 MPa)

The recombined live oil was used to saturate a slim tube of ¼" (0.635 cm) inner diameter and 40' (12.19 m) length that was packed with 200 mesh sand. The pore volume of the slim tube was 141.7 cc, the slim tube had a porosity of from 40 to 44% and a permeability of from 3-4 Darcy. The slim tube was pressurized to the pressure of the formation from which the oil was recovered (38.3 MPa) and the temperature of the slim tube was adjusted to the formation temperature (79.4° C.) to model the formation from which the oil and the associated gas was produced.

Samples of an associated gas/dimethyl ether mixture were prepared containing 4.9 mol %, 18.5 mol %, and 38.8 mol % dimethyl ether to formulate injection gases of different DME enrichment. Another sample was prepared containing only the associated gas.

Each sample was then injected at a constant rate into the slim tube saturated with the recombined live oil using a 10 cc/hr injection rate until 1.2 pore volumes of the sample gas were injected into the slim tube. Oil recovery, produced oil API gravity, effluent density, effluent composition, and oil gas-to-oil ratio data were measured after every 0.1 pore volume of sample injected. GC analysis of the produced liquid was selectively performed before and after gas breakthrough. At the conclusion of each sample gas injection the slim tube was shut in and attached to a separator to blow the slim tube down to atmospheric pressure. The composition of the liquid produced was measured and the amount of hydrocarbon was calculated. A mass balance on all the oil and produced associated gas (in situ, produced, and residual) was performed to ensure that the mass balance was about 100%.

Figure 3:
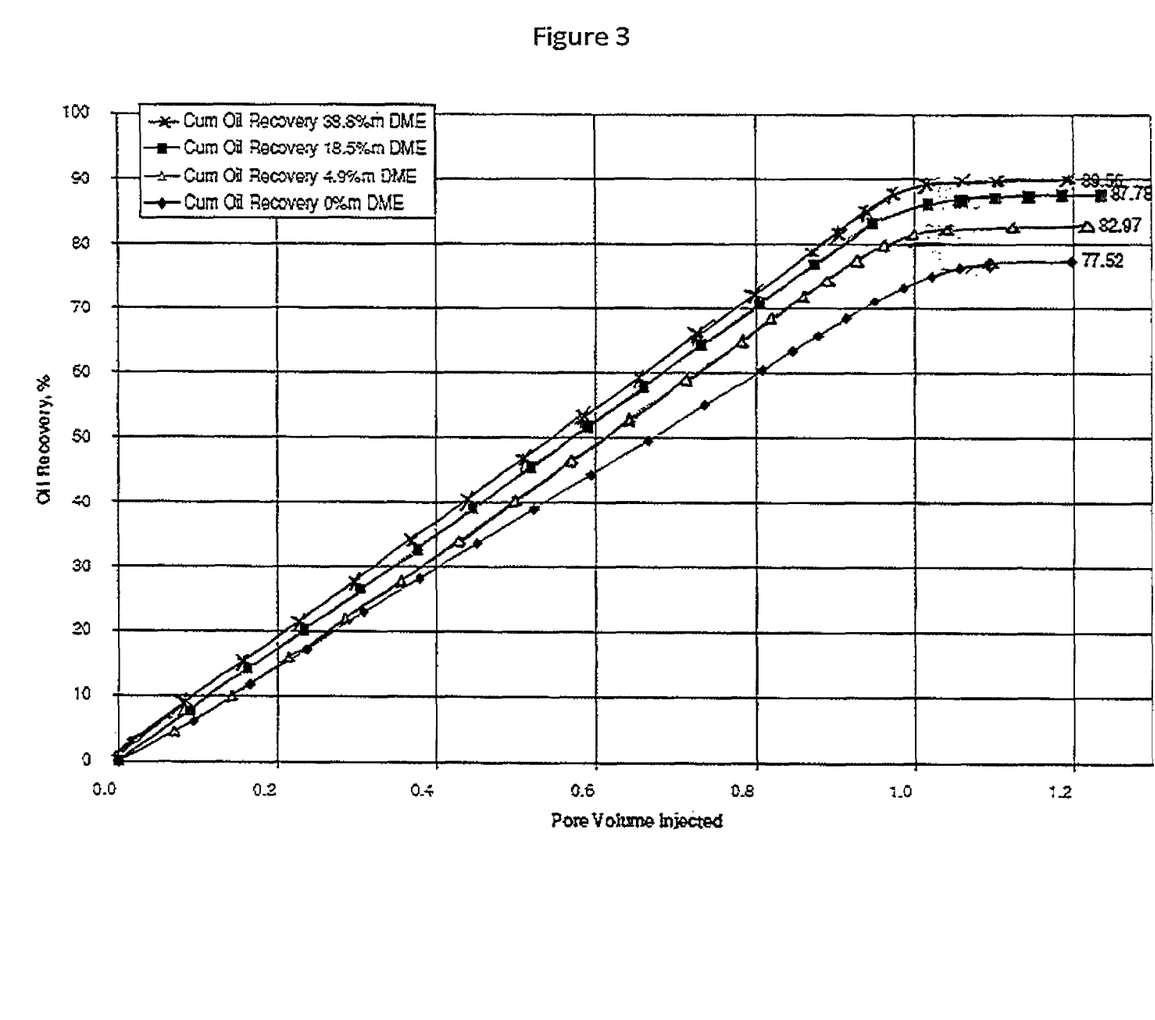
FIG. 3 is a graph of oil recovery relative to pore volume injected of an injectant containing selected quantities of dimethyl ether.

The slim tube oil recovery results for each sample after injection of 1.2 pore volumes of sample are shown in Table 3, and FIG. 3 shows the cumulative oil recovery for each sample over the course of the sample injection.

TABLE 3

| DME (mol %) in injected gas | % Oil Recovery at 1.2 Pore Volumes |
|---|---|
| 0 | 77.5 |
| 4.86 | 83.0 |
| 18.53 | 88.0 |
| 38.79 | 89.6 |

Oil recovery improvement relative to injection with the associated gas only was observed with DME at all enrichment levels.

The compositional analysis of the produced dead oil showed that $C_2$ to $C_8$ components in the produced oil gradually decreased with increasing pore volumes of gas injection, $C_9$ to $C_{28}$ components of the produced oil gradually increased with increasing pore volumes of gas injection, $C_{28}$ to $C_{35}$ and $C_{35+}$ components in the oil gradually decreased with increasing pore volumes of gas injection, and DME concentrations in the range of 0.16 to 0.28 mol % were observed at various stages of the oil displacement.

Figure 4:
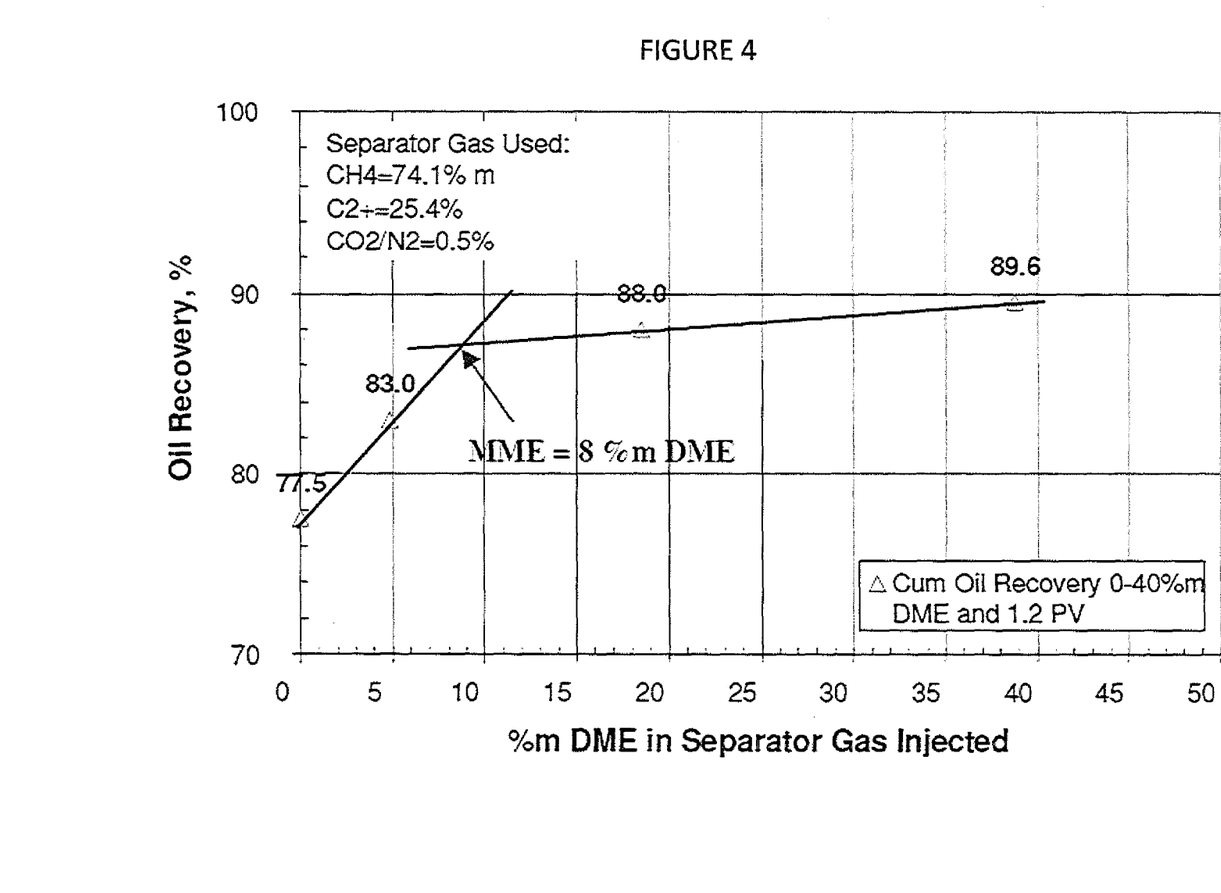
FIG. 4 is a graph illustrating the minimum miscibility enrichment point of an oil with dimethyl ether.

As shown in FIG. 4, a distinct change in the slope of a plot of oil recovery (%) relative to the amount of DME in the injected gas (mol % DME) indicated that a minimum miscibility enhancement provided by DME in the injected gas occurred at about 8 mol % DME.

Example 2

An oil swelling test was performed to measure the effects of adding 20.74 mol % DME in the oil utilized in Example 1 above. The oil had the characteristics set forth in Table 1 above. For comparison, an oil swelling test was run on a blank sample containing only the oil, and an oil swelling test was performed in which 20 mol % of $CO_2$ was added to the oil.

The oil swelling tests were conducted in a visual PVT cell. For each test, the cell was charged with a measured volume of live oil (prepared as described in Example 1) at a pressure higher than saturation pressure (38.3 MPa) and at the formation temperature of the formation from which the oil was produced (79.4° C.), and 20.7 mol % DME or 20 mol % $CO_2$. Upon addition of the gas, the cell was pressurized until the fluid reached a single phase. As the cell was pressurized, a constant composition expansion test was conducted to measure the saturation pressure and relative liquid volume below the saturation pressure of the resulting fluid. Upon pressurization to a single phase, the single phase fluid was sampled and measured for the oil formation volume factor, fluid density, compositions of flashed oil and flashed gas, dead oil density, and live oil viscosity in a single stage separator test. These steps were repeated until the system had sufficient gas added such that dewpoint behavior was exhibited. At this point, a small volume of the original live oil was added to make the system behave as a bubble point system. Then the oil density, viscosity (except for $CO_2$), and the volume of fluid at saturation pressure of the sample were measured. The swelling factor was then calculated, where the swelling factor is the volume of fluid at saturated pressure divided by the volume of oil (without added DME or $CO_2$) at saturated pressure. Table 4 provides a summary of the effect of adding approximately 20 mol % DME and 20 mol % $CO_2$ on the oil saturation pressure, the density, the viscosity, and the swelling factor of the oil.

TABLE 4

| Property Change (relative to live oil with no DME or $CO_2$) | DME (about 20 mol %) | $CO_2$ (about 20 mol %) |
|---|---|---|
| Oil Saturation Pressure | 32% reduction | 26% increase |
| Density | 7% reduction | 1% increase |
| Viscosity | 29% reduction | Not measured |
| Swelling | 28% increase | 7% increase |

The results indicate that addition of DME decreases the oil saturation pressure, the oil density, and the oil viscosity while increasing the oil swelling factor, which would improve the mobility of oil in a formation. DME was shown to be about 4 times superior to $CO_2$ in swelling the volume of the oil.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed:

1. A method for recovering oil from an oil-bearing formation, comprising:
   injecting into the formation an enhanced oil recovery formulation consisting of gas which gas comprises at least 5 mol % of an ether having from 2 to 4 carbon atoms and at least 70 mol % of a hydrocarbon-containing gas, where the hydrocarbon-containing gas is comprised of at least 70 mol % methane;
   reducing via the ether the minimum miscibility pressure required for the methane present in the formulation, wherein the reduced miscibility pressure of the methane enables the enhanced oil recovery formulation to become miscible with the oil at the formation pressure;
   contacting the enhanced oil recovery formulation with oil in the oil-bearing formation to mix the gas of the enhanced oil recovery formulation with the oil; and
   producing oil from the formation.

2. The method of claim 1 wherein contacting the gas of the enhanced oil recovery formulation with oil in the oil-bearing formation to mix the gas with the oil mobilizes the contacted oil in the formation.

3. The method of claim 1 wherein contacting the gas of the enhanced oil recovery formulation with the oil in the oil-bearing formation to mix the gas with the oil swells the oil.

4. The method of claim 1 wherein contacting the gas of the enhanced oil recovery formulation with the oil in the oil-bearing formation reduces oil-water interfacial tension between oil and water in the formation.

5. The method of claim 1 wherein the formation is a subterranean formation.

6. The method of claim 5 wherein the subterranean formation is located at a depth of from 200 to 1500 meters.

7. The method of claim 1 wherein at least a portion of the gas of the enhanced oil recovery formulation is produced from the formation.

8. The method of claim 1 wherein the oil in the formation has a viscosity of at most 15 cP prior to contact with the enhanced oil recovery formulation.

9. The method of claim 1 wherein a displacement fluid is injected into the formation subsequent to the injection of the enhanced oil recovery formulation into the formation.

10. The method of claim 9 wherein the displacement fluid is water.

11. The method of claim 1 wherein the ether is dimethyl ether.

12. The method of claim 1 wherein the formation has a pressure of at most 45 MPa.

* * * * *